(12) United States Patent
Selbie et al.

(10) Patent No.: US 12,177,740 B2
(45) Date of Patent: Dec. 24, 2024

(54) MANAGING MOBILE DATA GATHERING AGENTS

(71) Applicant: Univrses AB, Stockholm (SE)

(72) Inventors: Jonathan Nels George Selbie, Stockholm (SE); Sven Ake Ricky Helgesson, Mariefred (SE); Alessandro Pieropan, Stockholm (SE)

(73) Assignee: Univrses AB, Stockholm (SE)

( * ) Notice: Subject to any disclaimer, the term of this patent is extended or adjusted under 35 U.S.C. 154(b) by 233 days.

(21) Appl. No.: 17/449,254

(22) Filed: Sep. 28, 2021

(65) Prior Publication Data

US 2023/0099178 A1  Mar. 30, 2023

(51) Int. Cl.
*H04W 4/029* (2018.01)
*G06Q 50/26* (2012.01)

(52) U.S. Cl.
CPC ............ *H04W 4/029* (2018.02); *G06Q 50/26* (2013.01)

(58) Field of Classification Search
CPC .............................. G06Q 50/26; H04W 4/029
See application file for complete search history.

(56) References Cited

U.S. PATENT DOCUMENTS

| | | |
|---|---|---|
| 7,421,334 B2 | 9/2008 | Dahlgren et al. |
| 7,676,377 B2 | 3/2010 | Hamidpour |
| 8,412,393 B2 | 4/2013 | Anderson et al. |
| 9,416,499 B2 | 8/2016 | Cronin et al. |
| 10,378,160 B2 | 8/2019 | Walker et al. |
| 10,523,759 B2 | 12/2019 | Dudar et al. |
| 10,628,802 B2 | 4/2020 | Durand et al. |
| 10,726,723 B1 * | 7/2020 | Madden ................. G08G 1/148 |

(Continued)

FOREIGN PATENT DOCUMENTS

| | | | |
|---|---|---|---|
| EP | 2827259 A1 | 1/2015 | |
| EP | 3696511 A1 * | 8/2020 | ............. G01C 21/30 |

(Continued)

OTHER PUBLICATIONS

International search report issued in PCT/SE2022/051140 on Jan. 12, 2023.

(Continued)

*Primary Examiner* — Dai Phuong
(74) *Attorney, Agent, or Firm* — Noréns Patentbyrå AB (57) ABSTRACT

Methods and apparatus, including computer program products, implementing and using techniques for generating a map of physical features in a physical environment. Feature datasets are received from several mobile agents. A feature dataset includes data describing a detected physical feature, a geolocation of the feature, and a timestamp representing when the physical feature was detected. The geolocation data for the different feature datasets are integrated into a map of the physical environment and displayed to a user. One or more regions of interest are identified on the map. The regions of interest include geographical areas for which no feature datasets or an insufficient number of feature datasets have been collected. In response to identifying the regions of interest, one or more mobile agents are instructed collect supplemental feature datasets for the regions of interest. The map is updated with the supplemental feature datasets for the identified regions of interest.

15 Claims, 2 Drawing Sheets

(56) References Cited

U.S. PATENT DOCUMENTS

| | | |
|---|---|---|
| 10,974,727 B2 | 4/2021 | Zhang et al. |
| 11,006,082 B2 | 5/2021 | Carlson |
| 2013/0011017 A1 | 1/2013 | Oh et al. |
| 2015/0019121 A1 | 1/2015 | Gao et al. |
| 2015/0161440 A1 | 6/2015 | Chao et al. |
| 2016/0180239 A1* | 6/2016 | Frankel ............... G06V 40/172 |
| | | 706/12 |
| 2017/0176191 A1 | 6/2017 | Li et al. |
| 2019/0095728 A1 | 3/2019 | Mielenz |
| 2020/0195892 A1 | 6/2020 | Carlson |
| 2020/0213006 A1 | 7/2020 | Graham et al. |
| 2020/0240794 A1 | 7/2020 | Prasser et al. |
| 2021/0027624 A1 | 1/2021 | Oberdanner et al. |
| 2021/0049363 A1 | 2/2021 | Cunha et al. |
| 2021/0327130 A1 | 10/2021 | Vahdat-Pajouh et al. |
| 2022/0063498 A1* | 3/2022 | Matsumura ............. G06F 18/22 |
| 2022/0122316 A1 | 4/2022 | Huffman et al. |
| 2022/0196784 A1 | 6/2022 | Wirola et al. |
| 2022/0230441 A1* | 7/2022 | Tahara .................. G08B 25/00 |
| 2022/0366175 A1* | 11/2022 | Yu .......................... G01S 17/931 |
| 2023/0368506 A1* | 11/2023 | Nicosevici .......... G06F 18/2148 |
| 2024/0221306 A1* | 7/2024 | Joseph ..................... G01S 5/16 |

FOREIGN PATENT DOCUMENTS

| | | | |
|---|---|---|---|
| EP | 3798573 A1 | 3/2021 | |
| WO | 2018017793 A1 | 1/2018 | |
| WO | 2020198167 A1 | 10/2020 | |
| WO | WO-2021001565 A1 * | 1/2021 | ......... G01C 21/3841 |

OTHER PUBLICATIONS

International Search Report & Written Opinion, Swedish Intellectual Property Office, Dec. 8, 2022, Stockholm, Sweden.

\* cited by examiner

MANAGING MOBILE DATA GATHERING AGENTS

BACKGROUND

The present invention relates to detecting features or anomalies concerning public and/or private infrastructure, and more specifically, to a cognitive system and associated methodology that orchestrates several mobile data collecting agents to inspect, monitor and/or determine features or anomalies in various regions of interest.

Monitoring and maintaining infrastructure, both in a public and in a private setting, is typically a very time-, resource- and cost-intensive undertaking. Addressing issues adequately and at an early stage may save significant amounts of money, both for private actors and for society at large. For example, in Sweden, car damage resulting from poor road quality cost Swedish private car owners the equivalent of approximately 100 million USD a year. In many cities, reports from citizens are the only source of road damage data available. When a citizen report is received, an inspector goes out to inspect the damage. However, often it is not easy to find the location of the damage, as the position provided in the citizen report may be imprecise in an urban environment, or sometimes there is no location reported. Once the road damage has been found, the inspection is done manually and subjectively assesses the road surface. Since the city only receives reports from a limited number of people, there is no overview that shows the overall road status of the city, thus making it difficult for the officials responsible for the road network to determine what locations to prioritize for repair.

These general types of problems are not limited to road damage. All across Europe, there is a growing backlog in traffic sign maintenance. For example, in Germany 33% of the traffic signs are considered unreadable, and in France 40-50% of the traffic signs have outlived their expected lifetime performance. Again, locating damaged traffic signs often relies on citizen engagement. Similar to the road damage reports, a city typically only receives a limited number of reports relating to traffic signs. In addition, there is a limited number of inspectors and it is essentially impossible for them to cover every street in the city. As a result, there is currently no way to obtain an overview of where all the traffic signs are located and their individual statuses.

Yet another, related issue pertains to roadworks. In a typical scenario, every week, roadwork inspectors travel through an urban area to conduct inspections of active roadworks. The roadwork inspectors look to ensure that the site of the roadwork is safe, that the roadwork is proceeding according to schedule, and that the traffic around the roadwork is not too adversely impacted. However, the roadwork inspectors may often have problems finding the roadworks. This is because the agreement with a contractor for when the work should be done is often loosely defined (e.g., within a 3 month window). However, in most cases the time window when the actual work occurs is much shorter. Therefore, the city does not have a clear idea of where there are ongoing roadworks in the city on any given day, and as a result, the roadwork inspectors sometimes end up traveling to sites to carry out inspections only to discover that there is no roadwork road work activity at the time. These unnecessary trips may cause thousands of wasted working hours per year and create unnecessary costs for the city. Further, missed inspections can also result in poor compliance, increased traffic congestion and reduced safety.

These are merely a few examples, but they all illustrate the difficulties involved in obtaining an overview of what is occurring on a larger scale in a city on any given day, and how to address these issues in the best possible manner. There have been attempts to somewhat mitigate these problems, for example, through the use of images recorded by stationary surveillance cameras, or through the use of images stored in online databases, such as Google Street View. However, such data is often stale (i.e., the image is no longer representative of the current reality) and is therefore of very limited use in a decision making context, and could even lead to incorrect actions resulting lost time, money, lives, etc. Thus, there is a need for better methods and systems for collecting current data relating to features and anomalies, and to process the collected data in such a way that it can be efficiently used in a decision making process for how to address the identified problems.

SUMMARY

In general, in one aspect, the various embodiments of the invention provide methods and apparatus, including computer program products for generating a map of physical features in a physical environment. Feature datasets are received from several mobile agents. A feature dataset includes data describing a detected physical feature, a geolocation of the feature, and a timestamp representing when the physical feature was detected. The geolocation data for the different feature datasets are integrated into a map of the physical environment and displayed to a user. One or more regions of interest are identified on the map. The regions of interest include geographical areas for which no feature datasets or an insufficient number of feature datasets have been collected. In response to identifying the regions of interest, one or more mobile agents are instructed collect supplemental feature datasets for the regions of interest. The map is updated with the supplemental feature datasets for the identified regions of interest.

The various embodiments of the invention can include one or more of the following features. The integrating, identifying, instructing, and updating steps can be repeated for the supplemental data features until a termination condition has been reached. The map can represent an urban environment and includes one or more streets, and the physical features can include conditions of the streets, signage relating to the streets, or pedestrian or vehicle traffic in or around the streets. The feature dataset can include an image of the feature. The mobile agents include a cell phone camera or a camera mounted in a vehicle, and a neural network trained to detect one or more categories of physical features in the images captured by the cell phone camera or the mounted camera. The one or more mobile agents can include a radio communication device for communicating the feature datasets, a position of the mobile collection agent, and/or metadata to a cloud service, and for receiving dispatch instructions.

It can be determined whether two or more feature datasets received from two or more mobile agents pertain to the same physical feature, and in response to determining that the two or more feature datasets pertain to the same physical feature, the two or more feature datasets can be consolidated into a single feature dataset. A history for a physical feature can be displayed to the user. The history can be generated from feature datasets sharing the same geolocation and having different time stamps. Instructing the one or more mobile agents to collect supplemental feature datasets can includes:

changing one or more collection parameters on one or more mobile agents prior to starting the collection of supplemental feature datasets.

Instructing one or more mobile agents to the selected regions of interest can include providing an incentive to the mobile agent in response to visiting an identified region of interest to collect supplemental feature datasets. Instructing one or more mobile agents to collect supplemental feature datasets can include optimizing the number of mobile agents in a given region of interest to avoid redundant supplemental feature dataset collection for the region of interest. The mobile agents can be ground based mobile agents. The mobile agents can be autonomous vehicles. Problems with detected physical features can be identified based on information in the feature datasets, and corrective measure can be provided to address the identified problems. The map can further include third-party data not collected by the mobile agents.

In general, in another aspect, the various embodiments of the invention provide a system for generating a map of physical features in a physical environment. The system includes one or more mobile agents configured to detect physical features in a physical environment; a data store operable to store data collected by the one or more agents; a map generator operable to generate a map of the physical environment that includes data collected by the one or more agents; a computing device operable to display the generated map to a user and to receive instructions from the user; an orchestrator component operable to receive high-level user instructions translate the received instructions to lower-level instructions for the one or more agents; an agent configuration data repository containing configuration data and settings for use by the one or more agents; a processor; and a memory.

The memory contains instructions that when executed by the processor causes the processor to perform the following actions:

receiving feature datasets from a plurality of mobile agents configured to detect physical features, wherein a feature dataset includes data describing a detected physical feature, a geolocation of the physical feature, and a timestamp representing a time at which the physical feature was detected;

integrating the geolocation data for the different feature datasets into a map of the physical environment and displaying the physical map with the integrated geolocation data to a user;

identifying one or more regions of interest on the map, wherein the one or more regions of interest include geographical areas for which no feature datasets or an insufficient number of feature datasets have been collected;

in response to identifying the one or more regions of interest, instructing one or more mobile agents to collect supplemental feature datasets for the identified regions of interest; and updating the map with the supplemental feature datasets for the identified regions of interest.

The details of one or more embodiments of the invention are set forth in the accompanying drawings and the description below. Other features and advantages of the invention will be apparent from the description and drawings, and from the claims.

BRIEF DESCRIPTION OF THE DRAWINGS

Like reference symbols in the various drawings indicate like elements.

DETAILED DESCRIPTION

Overview

The various embodiments of the invention pertain to techniques for generating a map of physical features in a physical environment, such as a city or a neighborhood, which provides current information and a general overview about various issues that are occurring in the physical environment. The map can be used as a tool by a user responsible for the physical environment to initiate corrective measures for the detected issues. For example, a map depicting a city can illustrate where potholes or other types of road damage can be found, where there are damaged road signs, or where ongoing roadwork may cause traffic jams, just to mention a few examples. Each of these issues can also be accompanied on a map by an indicator showing the "severity" of the issue, which can aid the user in prioritizing corrective actions, and dispatching appropriate resources to correct the problems.

In particular, a number of mobile agents (hereinafter referred simply to as "agents") collaborate to gather data about the physical environment. The collected data is integrated (possibly with additional third party data) into a map that is displayed to a user. Based on the information included in the map, the user can decide how to best address the detected issues. In order to collect the data in the most efficient way by the agents, an orchestrator component can be used. The orchestrator component (referred to below simply as the "orchestrator") receives "high-level goals" from the user, such as "monitor the city roads for damage at least once per week." The orchestrator then interprets these high-level goals and creates lower-level data gathering tasks for the agents. For example, the orchestrator may create tasks and/or routes for individual agents to gather data according to the lower-level objectives. The lower-level data gathering tasks may also include providing suggested routes and/or rewards to the agents to achieve coverage of a certain geographical area within a certain timeframe, or to adapt the sensing technology on certain agents to collect certain types of data, and so on. All of these operations occur with a high degree of automation and involves a range of techniques, such as 3D Positioning, 3D Mapping, 3D Localization, Spatial Deep Learning and Visual-inertial Simultaneous Localization And Mapping (SLAM), Light Detection And Ranging (LIDAR) SLAM, Visual Odometry, Object Detection, Tracking and more. This will be discussed in further detail below.

As a result of this improved data collection and visualization to the user, the user or manager responsible for the physical environment can then make better and more rapid decisions for addressing the uncovered issues, which will have a beneficial effect on many of the problems noted in the background section of this document.

System Architecture

Figure 1:
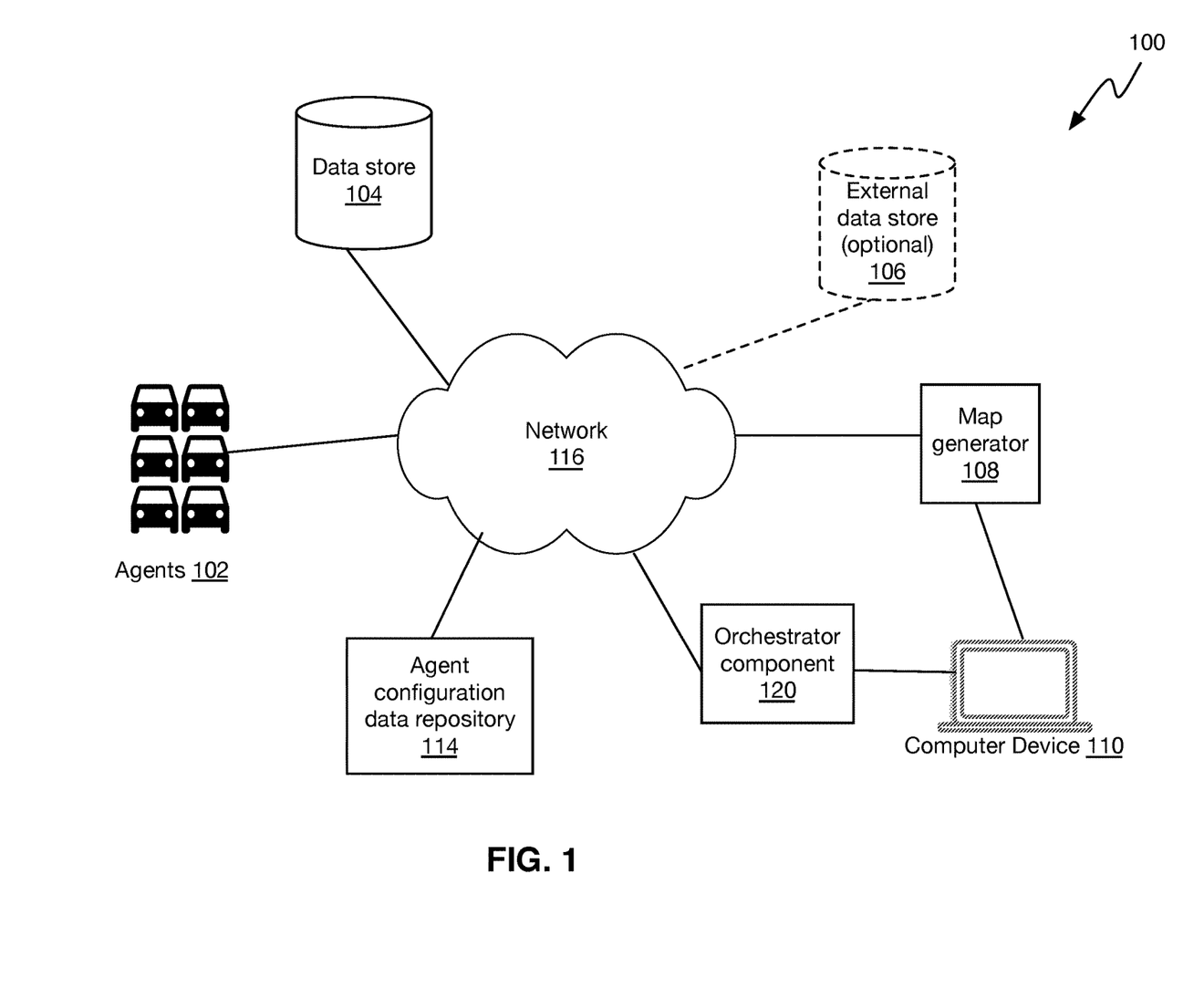
FIG. 1 shows a schematic diagram of a system for generating a map of physical features in a physical environment, in accordance with one embodiment.

FIG. 1 shows a schematic view of a system 100, in accordance with one implementation, for detecting features and/or anomalies in a physical environment. As can be seen in FIG. 1, the system 100 includes several agents 102 that collect data about the physical environment, a data store 104 that stores data collected by the agents 102, an optional external data store 106 that stores external data, a map generator 108, a computing device 110, an orchestrator component 112, and an agent configuration data repository 114. All of these units communicate over a network 116 which can be any combination of wired or wireless communication networks, using conventional communication protocols that are familiar to those having ordinary skill in the art.

The agents 102 are vehicles that can move on the ground or in the air, and that are equipped with imaging sensors and motion sensors to record images and positional data, respectively. Some examples of agents 102 include motor vehicles, aircraft, bicycles, drones, or any other manned or unmanned vehicle. The imaging sensors can be permanently or temporarily mounted in the agents, and can include various types of cameras, for example, a cell phone camera or a camera disposed in an Internet of Things (IoT) device. The positional information for an agent 102 can be determined, for example, by means of a sensor associated with a Global Navigation Satellite System permanently or temporarily mounted in the agent 102, and can include inputs from various types of cameras, for example, a cell phone camera or a position sensor in an Internet of Things (IoT) device.

In the illustrated embodiments, the agents 102 are also equipped with a computing device or processor, as well as a data link, such as a cellular 4G or 5G connection. This allows the agents 102 to perform pre-processing of the collected image and positional data prior to sending the data, thorough the data link, to the data store 104. The pre-processing can significantly reduce the amount of data that is sent from the agents 102 to the data store 104, thus making the transmission more efficient and reducing the amount of data that is kept at the data store 104. The agents 102 can also communicate with the agent configuration data repository 114 to obtain specific settings and software, such as image processing and/or neural network software, that is tailored to the particular type of the data the agent is expected to collect and pre-process. Typically, the pre-processing on the agents 102 involves analyzing the captured images to extract "useful" information, in accordance with the settings obtained from the agent configuration data repository 114, refining the information and transmitting it along with the positional information to the data store 104. This will be described in further detail below and with reference to FIG. 2.

The data store 104 contains data recorded and pre-processed by the agents 102. The data store 104 can be implemented on a cloud-based platform, which can be a private cloud-based platform, a public cloud-based platform or a hybrid of the two. In addition to storing data in the data store 104, the cloud-based platform can also perform further processing of the data before the data is stored. Some examples include anonymization, refinement of data, for example, with respect to positioning, clustering (i.e., determining whether a new detection is actually something new or something that has been detected earlier), and comparing newly received data with existing data about an area to update an inventory or identify discrepancies between data in the data store 104 and the real world.

Some implementations also include an external data store 106. The external data store 106, contains third-party data that can be combined with the data in the data store 104 to enhance the versatility of the data in the data store 104. For example, the external data store 106 may include information relating to weather, road regulations (e.g., speed limits) for various road segments, inventory of assets (e.g., traffic signs) beside the road, temporary changes (e.g., roadworks), maps of parking spaces, etc. Similar to the data store 104, the external data store 106 can be implemented on a cloud-based platform, which can be a private cloud-based platform, a public cloud-based platform or a hybrid of the two.

The map generator 108 obtains data from the data store 104, and optionally the external data store 106, and superimposes the data on a map of the physical environment. There are many commercially available maps that can be used for these purposes. The map generator 108 can be implemented locally on a computer device, or as a cloud application.

The computing device 110 is used to display the generated map to a user, who typically is a manager having certain responsibilities with respect to the physical environment, e.g., a city or portion thereof. The map may be displayed on a display that is incorporated in the computing device 110 (e.g., in the case of a mobile phone, tablet, laptop, or similar devices) or on a display that is external to the computing device 110 (e.g., one or more separate computer monitors). The computing device 110 further includes an input such as a keyboard, mouse, touch screen, and/or a voice input to receive instructions from the user, as well as an interface (e.g., wireless or electrical/mechanical connection such as a USB port or a CD-ROM) to permit import of program instructions to change, modify or alter the map, and to provide instructions to the orchestrator 112.

The map can be displayed in a web-based user interface on the display, or in a standalone application that is implemented locally on the computing device 110. Typically, the user interface for the map contains a number of controls allowing the user to zoom in or out, pan, etc., as well as controls for selecting what "layers" should be displayed. For example, the user may choose to display information relating to congestion, types of roads, speed limits, road works, parking availability, etc. The user can then examine this information and use the computing device 110 to provide instructions as high-level goals to the orchestrator 112. In some implementations, the user may also access historical data, so she can see, for example, how long a roadwork has been in progress, or how the overall number of potholes in a particular area of a city has changed over the past couple of months, etc.

The orchestrator 112 receives the high level goals from the user and breaks down the goals into smaller tasks that are subsequently provided to the agents 112, along with the required configuration settings (or instructions for how the agents 102 can retrieve the configuration settings themselves) from the agent configuration data repository 114. For example, a high level goal might be "Provide information on a weekly basis about any new roadworks started in this area of the city," or "Monitor for potholes daily during the winter months, but only weekly during the summer months." The orchestrator 112 can then either set up a schedule explicitly instructing specific agents 102 to go to specific sections of the city to collect specific data during specific time periods. While this may work well for autonomous agents 102, such as self-driving vehicles, it may work less well when the agents 102 are operated by humans, for example, taxi or bus drivers. In such a situation, it may be instead be better to offer some kind of incentive to the drivers, as will be described in further detail below with reference to FIG. 2.

The agent configuration repository 114 contains data that can be sent to, or retrieved by, the agents 102. Typically, this configuration data relates to what data the agents 102 should collect, and how the data should be processed on the agents 102 before the data is sent to the data store 104, as described above. The data in the configuration repository 114 can include, for example, different convolutional neural networks or image processing software to be used by the agents 102, based on the target data to be collected, what data to send to the data store 104, how often to send data to the data store 104, and so on.

Example Embodiment: Road Damage

The invention will now be described in further detail by way of example and with reference to FIG. 2, which shows a flowchart for a method 200 for generating a map of physical features in a physical environment, in accordance with one embodiment. Specifically, the example pertains to generating a map that displays an overall assessment of road damage in a section of a city. However, it should be realized that this example is not limiting and that similar principles can be applied to other features, such as traffic signs, roadwork, parking availability, traffic congestion, road obstructions, etc. Thus, many variations of the techniques that will now be described will be readily available to those having ordinary skill in the art.

Figure 2:
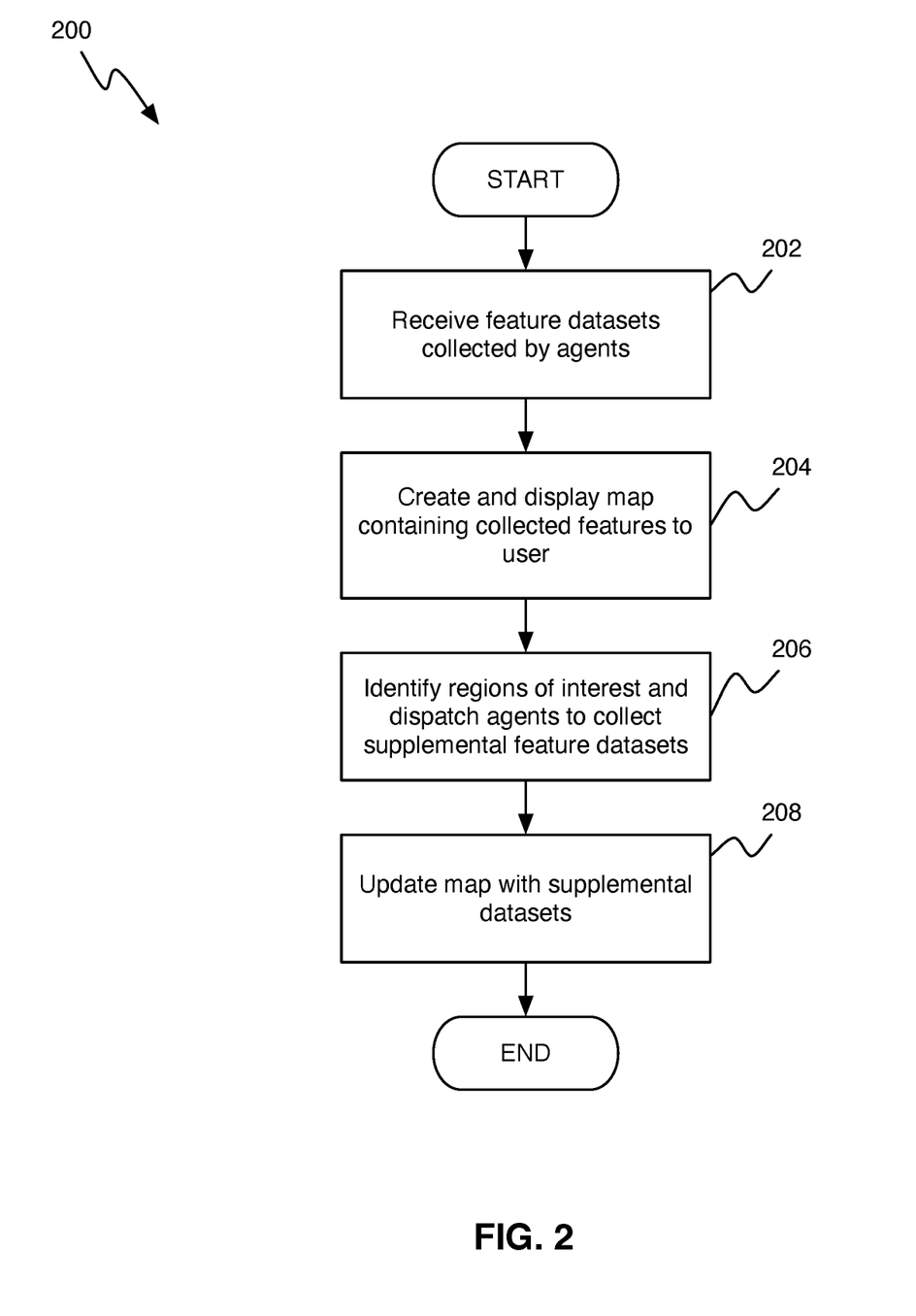
FIG. 2 shows a flowchart of a method for generating a map of physical features in a physical environment, in accordance with one embodiment.

Turning now to FIG. 2, as can be seen in FIG. 2, the method 200 starts by receiving feature datasets collected by the agents 102, step 200. As was mentioned above, the agents 102 are vehicles that can move on the ground or in the air, and which are equipped with imaging sensors and motion sensors to record images and positional data. Depending on the particular implementation, the agents 102 can move independently throughout the city, i.e. more or less at random, or in a more controlled manner, which is typically directed by the orchestrator 112, as described above. The ultimate purpose of the agents 102 is to fulfill the higher level goals that have been defined by the user.

The type of data that is collected by the agents 102, may vary in different implementations. In this particular example, where the user is interested in creating an overview of the road damage situation in a city, different types of sensors are used, alone or in combination, by the agents 102 to determine where the road damage is located. Some examples of suitable sensors include sensors associated with a Global Navigation Satellite System (e.g., GPS, GLONASS, Baidu, etc.), imaging sensors, inertial sensors. The information captured by these sensors can be triangulated to provide the precise position of a detected feature (e.g., road damage) by an agent 102. Image sensors are used to capture images of the road damage, and image analysis software, which may include neural networks, is used to assess the conditions of the potholes. In one implementation, all of these operations occur on a single device, such as a cell phone, which can be temporarily mounted, for example, on the dashboard of a car or on the handlebars of a motorcycle or bicycle, etc.

Typically, the software used by the agents 102 is downloaded to the agents 102 from the agent configuration data repository 114 before the agents 102 are put into active use. For example, in the context of a smartphone being used as an agent 102, the user installs an app (which can be obtained from a standard app store online), which includes a configuration file that instructs the app as to what settings/CNN to use to detect the feature of interest. The agent 102 can then retrieve these settings/CNN from the agent data repository 114 prior to collecting data. In implementations where the agent 102 is a connected car, the app can be customized for the particular type of car. Having the ability to download software to the agents 102 makes it possible to reconfigure the agents 102 for different purposes. For example, an agent 102 may be configured to detect potholes in the morning, and to detect the road signs the same afternoon. This makes the system 100 much more flexible and efficient compared to if every agent 102 had a single, dedicated purpose. The user interface of the app can have various degrees of configurability, but in general it is desirable to keep it as simple as possible so it can be used by a wider group of people without requiring any special technical skills. For example, in one embodiment, the user interface can include basic mounting instructions for the phone, controls for starting and stopping data collection, indications of features being detected using graphics on the screen of the phone, and controls for obtaining a summary of features detected during a data collection session.

As image data can be quite large, one significant purpose of the software on the agents 102 is to reduce the amount of data and create a smaller feature dataset that is transmitted to the data store 104, rather than a number of images. This can be done in a number of ways, which all depend on the particular situation at hand. For example, when collecting data relating to road damage, the agent captures positional information and images as the agent travels along the streets of a city. In one implementation, the road is divided into smaller sections, herein referred to as "bins," which are defined with respect to a global reference frame, such as WGS-84 or a local cartesian projection, such as OSGB36, both of which are familiar techniques to those having ordinary skill in the art. Typically, a bin corresponds to a section of road that is approximately 5-7 meters long. The images captured while the agent 102 travels across a bin are analyzed on the agent 102 by a CNN obtained from the agent configuration data repository 114. Detections of specific instances of road damage are made (e.g., pothole, crack, patch, etc.) and the characteristics of the damage is assessed (e.g., large, long, location context, etc.). The output of the analysis is a "score" that represents the quality of the road section in that bin. For example, there may be scores in the range of 0-5 where a "0" may represent the quality of a newly resurfaced road and a "5" may represent significant damage. The bin is assigned an identifier which, together with the score and bin location coordinates, and optionally a single confirmation picture, form a feature dataset, is sent to the data store 104, using a radio link or some other type of connection between the agent 102 and the data store 104, as described above.

As was mentioned above, in some embodiments the data store 104 is implemented on a cloud computing platform. Before the feature set is stored in the data store 104, it may undergo further processing at the cloud computing platform. For example, the feature data set may be anonymized, duplicate feature datasets collected by other agents 102 may be identified and consolidated, the position (or bin in which the feature is positioned) may be refined, comparison with previous detections may be done to determine any changed states of the feature, combination (e.g. averaging) between multiple detections in local region may be made, etc. These are all different types of processing that will be subject to the circumstances at hand, and which can be realized by those persons having ordinary skill in the art.

Once the feature datasets have been received, the method proceeds with creating a map and displaying the map to the user, step 204. The map can be created by using a conventional geographical map in an electronic format, for example, similar to maps that are used by various mapping service providers, such as Google Maps, Apple Maps, etc., storing the collected feature datasets in a geo-referenced data type format (e.g., the GeoJson open standard format) and then adding the collected feature datasets to this map. In some implementations, various types of third party data, such as information relating to weather, road regulations (e.g., speed limits) for various road segments, inventory of assets (e.g., traffic signs) beside the road, temporary changes (e.g., roadworks), maps of parking spots, etc., can also be added to the map The created map is then displayed to the user on a user interface on the computing device 110. In the illustrated embodiment, the user interface is a web based user interface, and the user may select what kind of information to include on the map. For example, the user can decide to show information relating to road damage, road signs, speed limits, etc., in essentially any combination that will allow the user to draw relevant conclusions from the data collected by the agents 102.

Upon reviewing the map, the user (or in some implementations, the computing device 110 itself) identifies regions of interest to which agents 102 should be dispatched to collect supplemental datasets, step 206. For example, the user or computing device 110 may determine that there are certain areas of the map that do not contain sufficient information to assess the road condition and decide how to proceed with repairing potholes and other types of damage to the roads. For example, in a city where the agents 102 move around in a more or less arbitrary fashion, there may be large amounts of data collected for busy roads, but very little data collected for side streets that are less trafficked. The user can then, by means of the computing device 110, instruct the orchestrator 112 to collect supplemental datasets for these regions of interest.

The instructions to the orchestrator 112 can be fairly explicit, for example, "Collect additional road damage data for Green Street by 3 p.m." or they can be more complex and comprehensive, such as "Update road damage data for at least 80% of the main roads in sector A of the city every two weeks." The orchestrator 112 receives these instructions, assesses what agents 102 and configuration options are available, and instructs the agents 102 to collect the supplemental data that is needed.

As an illustrative example, consider a scenario in which a city manager may require data from each street in the city at a certain frequency in time. For example, a maintenance manager may want to survey each road for potholes and other damage in the city at a frequency of once per month. This is a goal created by the manager based on experience and corresponds to an understanding of how road damage evolves over time. The goal may vary (what is detected) as might the frequency (once per day; twice per month). The goal may also be dependent on type of road (once per day on major roads; once per week on minor roads); on location (once per day from inner city roads, once per week on rural roads) and may be ad-hoc (the city manager received a report about something specific and needs data to corroborate).

The orchestrator 112 is capable of observing both when each street in the city was last surveyed by an agent 102 and what was surveyed at that time. In order for the city manager's goal to be achieved, the orchestrator 112 generates routes (or generates rewards to influence an agent's route) and configures the agents' data collection equipment (e.g., smartphones) based on location and time such that agents 112 collect the right data as they travel down each street.

As the time since the last survey and the probability that the city manager's objective will not be met increase, the priority that is placed on re-surveying certain streets increases. For example, in some embodiments the increase in priority (for example, via some reward system) is linear with time. In other embodiments, the increase in priority is non-linear, for example, an agent 102 randomly travelling down and re-surveying a street may reset the "clock" for that street. As the time since the last survey approaches the deadline set by the city manager, the chance of an agent 102 randomly traveling down a particular street decreases and thus the need to "influence" the agents 102 to re-survey particular streets increases. As such, the level of reward offered to an agent 102 can increase substantially as the time since last survey reaches the point at which the city manager's high level goal will fail if no further survey is carried out in time.

In this way, the orchestrator 112 can provide instructions to agents 102 to collect data according to low level instructions that the agents 102 are capable of interpreting. But the instructions have been generated such that the individual agents' behaviors generate data that achieves the city manager's high-level goal.

As was mentioned above, in implementations where the agents 102 are autonomous vehicles, the orchestrator 112 can create lower level instructions by merely dispatching the same agents 102 again to collect the supplemental datasets, possibly with revised configuration settings, if needed, or dispatch other agents 102 to collect the supplemental datasets. In other implementations, where the orchestrator 112 has less direct control over the agents 102, the orchestrator 112 may provide incentives to the agents. For example, if 80% of the roads in a particular area have been covered, taxi drivers may be offered some kind of reward if they prioritize driving down the remaining 20% of the roads. For example, a taxi driver may receive a notification (e.g., a list of streets or a map) on her cell phone telling her that if she goes past one or more of these places within the next few minutes/hours/days, etc., she may qualify for a discount on gas prices at certain gas stations. As the skilled person realizes there is a very large number of ways in which to incentivize people to perform certain tasks, and it is impossible to provide a complete list herein. Suffice to say that there are multiple ways in which the agents 102 can be incentivized to collect the supplemental datasets.

Finally, the map is updated with the supplemental datasets, step 208. This concludes the method 200. The updating of the map can occur in a similar way to what was described above for the initial datasets in step 204. If the user deems that there is still not enough information available to decide how to address the road damage, steps 206 and 208 can be repeated until a sufficient number of supplemental data sets has been collected for the user to be satisfied with the information contained in the map. The user can then initiate actions to be taken to address the road damage issues. Exactly what these actions are, and how they are performed lies outside the scope of this invention.

In some embodiments, there may optionally be a feedback loop, such that when a particular issue, a pothole, say, has been marked as fixed by a repair crew, an agent 102 can be incentivized by the orchestrator 112 to go to that location to verify that the road is in a satisfactory condition, upon which the job of fixing the road damage can be automatically updated to a "completed" status.

Concluding Comments

It should be noted that while the example embodiments described above have been primarily focused on issues relating to road conditions, similar techniques could also be applied in other contexts. For example, managing a city's on-street parking is often problematic. The occupancy rate is often higher than agreed targets. Existing methods for monitoring available space and associated occupancy levels are time consuming, inefficient, expensive and may only happen at specific times during the year. The obtained data quickly gets stale and only has limited spatial coverage. As a result, providing the appropriate level of on-street parking is difficult—and finding a parking spot in the city is often difficult and stressful for a driver. Further, a significant portion of emissions from the transport sector arises due to people searching for a parking space. The lack of data about the current position of parking spaces with special designations (e.g. parking spaces designated for loading/unloading only, or parking spaced designated for disabled people) may also lead to specific problems.

Using the techniques described herein for purposes of mapping recent occupancy status of on-street parking spaces enables cities to better manage the stock of on-street parking. Recent changes, such as obstructions, temporary parking or roadworks can be more readily detected. This data can also be shared with drivers so they can be directed to the nearest available parking space, which results in fewer drivers searching for empty parking spaces, and therefore also has a beneficial effect on congestion and emissions, and in general creates a safer city environment.

It should also be noted that while the principles above have been described in the context of an urban environment, they can also be applied in various private settings. For example, in a large warehouse forklift trucks may be equipped with cameras and serve as mobile agents to detect people (safety hazards), damage, pallets, record accidents, etc. These recorded features and events can be provided in a "warehouse map" to the manager of the warehouse and allow the manager to get an overview of what is happening in the warehouse at any given moment and take appropriate action to address any issues.

Similarly, another setting in which these principles can be applied is the tarmac of an airport, where the consequences of any undetected issues or dangers might be even more crucial compared to an urban environment and need to be addressed even more rapidly. Various types of vehicles traversing the tarmac can be equipped with cameras and act as agents, and the results can be presented on a map to an airport manager who can decide what actions need to be taken to address any identified concerns. These are just two additional examples, and as the skilled reader realizes, there is a plethora of other areas in which the above techniques can be applied, such as train stations, subway stations, etc.

The orchestration techniques described above can also be used on a smaller scale in some implementations. For example, a city might be interested in doing regular inspections of water supply or sewage systems, or a building manager might be interested in inspecting the air ducts of a large office building, etc. With agents 102 properly configured for these specialized environments, the general principles described above can be applied also with respect to how the agents traverse these specialized environments.

Further, while the embodiments described above have used image sensors, such as cameras, it should be noted that there may be implementations in which other types of sensors can be used, such as optical sensors, infrared imaging sensors, ultraviolet imaging sensor, Light Detection and Ranging (LIDAR) sensors, Synthetic Aperture Radar (SAR) sensors, electromagnetic (EM) and/or acoustic sensors or any other sensor capable of producing one or more images of physical features in a physical environment.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for generating a map of one or more streets and one or more non-human physical features, comprising:
    receiving feature datasets from a plurality of mobile agents configured to detect physical features, wherein each mobile agent in the plurality of mobile agents includes a camera and a neural network trained to detect one or more physical features in images captured by the camera and pre-process the images captured by the camera to generate a feature dataset to be sent to a remote data store for inclusion in the map, wherein the feature dataset includes data describing a detected physical feature, a geolocation of the physical feature, and a timestamp representing a time at which the physical feature was detected, and wherein the feature dataset includes one or more of: conditions of the one or more streets, signage relating to the one or more streets, and pedestrian or vehicle traffic in or around the one or more streets;
    integrating the geolocation data for the different feature datasets into a map and displaying the map with the physical features and integrated geolocation data to a user;
    identifying one or more regions of interest on the map, wherein the one or more regions of interest include geographical areas for which no feature datasets or an insufficient number of feature datasets have been collected;
    in response to identifying the one or more regions of interest, instructing one or more mobile agents to collect supplemental feature datasets for the identified regions of interest, wherein the the instructing further includes adjusting one or more collection parameters on one or more mobile agents prior to starting the collection of the supplemental feature datasets to ensure a supplemental feature dataset collection that satisfies the insufficiencies of feature datasets for the identified one or more regions of interest; and
    updating the map with the supplemental feature datasets for the identified regions of interest.

2. The method of claim 1, further comprising:
    repeating the integrating, identifying, instructing, and updating steps for the supplemental data features until a termination condition has been reached.

3. The method of claim 1, wherein the feature dataset further includes an image of the feature.

4. The method of claim 1, wherein the camera is a: a cell phone camera or a separate camera mounted in a vehicle.

5. The method of claim 1, wherein the one or more mobile agents further include a radio communication device for communicating one or more of: the feature datasets, a position of the mobile collection agent, and metadata to a cloud service, and for receiving dispatch instructions.

6. The method of claim 1, further comprising:
    determining whether two or more feature datasets received from two or more mobile agents pertain to the same physical feature; and
    in response to determining that the two or more feature datasets pertain to the same physical feature, consolidating the two or more feature datasets into a single feature dataset.

7. The method of claim 1, further comprising:
    displaying to the user a history for a physical feature, the history being generated from feature datasets sharing the same geolocation and having different time stamps.

8. The method of claim 1, wherein instructing one or more mobile agents to the selected regions of interest includes:
    providing an incentive to the mobile agent in response to visiting an identified region of interest to collect supplemental feature datasets.

9. The method of claim 1, wherein instructing one or more mobile agents to collect supplemental feature datasets includes:
    optimizing the number of mobile agents in a given region of interest to avoid redundant supplemental feature dataset collection for the region of interest.

10. The method of claim 1, wherein the mobile agents are ground based mobile agents.

11. The method of claim 1, wherein the mobile agents are autonomous vehicles.

12. The method of claim 1, further comprising:
identifying problems with detected physical features, based on information in the feature datasets; and
providing a corrective measure to address the identified problem.

13. The method of claim 1, wherein the map further includes third-party data not collected by the mobile agents.

14. A computer program product for generating a map of one or more streets and one or more non-human physical features, the computer program product comprising a computer readable storage medium having program instructions embodied therewith, the program instructions being executable by a processor to cause the processor to perform the following actions:
receive feature datasets from a plurality of mobile agents configured to detect physical features, wherein each mobile agent in the plurality of mobile agents includes a camera and a neural network trained to detect one or more physical features in images captured by the camera and pre-process the images captured by the camera to generate a feature dataset to be sent to a remote data store for inclusion in the map, wherein the feature dataset includes data describing a detected physical feature, a geolocation of the physical feature, and a timestamp representing a time at
which the physical feature was detected, and wherein the feature dataset includes one or more of: conditions of the one or more streets, signage relating to the one or more streets, and pedestrian or vehicle traffic in or around the one or more streets;
integrate the geolocation data for the different feature datasets into a map and displaying the map with the physical features and integrated geolocation data to a user;
identify one or more regions of interest on the map, wherein the one or more
regions of interest include geographical areas for which no feature datasets or an insufficient number of feature datasets have been collected;
in response to identifying the one or more regions of interest, instruct one or more mobile agents to collect supplemental feature datasets for the identified regions of interest, wherein the the instructing further includes adjusting one or more collection parameters on one or more mobile agents prior to starting the collection of the supplemental feature datasets to ensure a supplemental feature dataset collection that satisfies the insufficiencies of feature datasets for the identified one or more regions of interest; and
update the map with the supplemental feature datasets for the identified regions of interest.

15. A system for generating a map of one or more streets and one or more non-human physical features, comprising:
one or more mobile agents configured to detect non-human physical features in an outdoor environment;
a data store operable to store data collected by the one or more mobile agents;
a map generator operable to generate a map of the outdoor environment that includes data collected by the one or more mobile agents;
a computing device operable to display the generated map to a user and to receive instructions from the user;
an orchestrator component operable to receive high-level user instructions translate the received instructions to lower-level instructions for the one or more mobile agents;
an agent configuration data repository containing configuration data and settings for use by the one or more mobile agents;
a processor; and
a memory containing instructions that when executed by the processor causes the processor to perform the following actions:
receiving feature datasets from a plurality of mobile agents configured to detect physical features, wherein each mobile agent in the plurality of mobile agents includes a camera and a neural network trained to detect one or more physical features in images captured by the camera and pre-process the images captured by the camera to generate a feature dataset to be sent to a remote server for inclusion in the map, wherein the feature dataset includes data describing a detected physical feature, a geolocation of the physical feature, and a timestamp representing a time at which the physical feature was detected, and wherein the feature dataset includes one or more of: conditions of the one or more streets, signage relating to the one or more streets, and pedestrian or vehicle traffic in or around the one or more streets;
integrating the geolocation data for the different feature datasets into a map and displaying the map with the physical features and integrated geolocation data to a user;
identifying one or more regions of interest on the map, wherein the one or more regions of interest include geographical areas for which no feature datasets or an insufficient number of feature datasets have been collected;
in response to identifying the one or more regions of interest, instructing one or more mobile agents to collect supplemental feature datasets for the identified regions of interest, wherein the the instructing further includes adjusting one or more collection parameters on one or more mobile agents prior to starting the collection of the supplemental feature datasets to ensure a supplemental feature dataset collection that satisfies the insufficiencies of feature datasets for the identified one or more regions of interest; and
updating the map with the supplemental feature datasets for the identified regions of interest.

* * * * *